United States Patent [19]

Roydhouse

[11] Patent Number: 4,876,025

[45] Date of Patent: Oct. 24, 1989

[54] COMPOSITION TO ABSORB MERCURY

[75] Inventor: Richard H. Roydhouse, Vancouver, Canada

[73] Assignee: EPS Environmental Protection Systems Limited, Vancouver, Canada

[21] Appl. No.: 191,724

[22] Filed: May 6, 1988

Related U.S. Application Data

[63] Continuation of Ser. No. 914,805, Oct. 3, 1986, abandoned.

[51] Int. Cl.⁴ .................................................. C09K 3/32
[52] U.S. Cl. .............................. 252/182.32; 252/184; 55/72
[58] Field of Search ........................... 252/184, 182.32; 423/210; 55/72

[56] References Cited

U.S. PATENT DOCUMENTS

| | | | |
|---|---|---|---|
| 3,875,287 | 4/1975 | Kurikami | 423/101 |
| 4,094,777 | 6/1978 | Sugier et al. | 210/32 |
| 4,226,600 | 10/1980 | Seidenberger | 23/232 R |
| 4,534,944 | 8/1985 | Roydhouse | 423/210 |

FOREIGN PATENT DOCUMENTS 1203525  4/1986  Canada .

Primary Examiner—Patrick P. Garvin
Assistant Examiner—George R. Fourson
Attorney, Agent, or Firm—Christie, Parker & Hale

[57] ABSTRACT

A composition to absorb mercury vapour and to suppress mercury vapour. The composition comprises an iodide and a polyhydric alcohol. It may include a Lewis acid. A method of absorbing mercury comprising applying to the source of the mercury the above composition is described.

6 Claims, No Drawings

COMPOSITION TO ABSORB MERCURY

CROSS-REFERENCE TO RELATED APPLICATIONS

This is a continuation of application Ser. No. 914,805, filed Oct. 3, 1986, now abandoned.

FIELD OF THE INVENTION

The invention relates to a composition able to absorb mercury vapour and to suppress formation of the vapour and to a method of absorbing and suppressing mercury vapour using the composition.

DESCRIPTION OF THE PRIOR ART

Liquid mercury is used in industry, hospitals, laboratories and dental offices. Mercury is a substance of considerable toxicity and emission of mercury vapour may occur from accidental spilling or volatilization. During the process of amalgamation or other operations with mercury-rich substances, mercury liquid or mercury-rich materials will release mercury vapour at room temperature and high concentrations can occur. Inhalation of low levels of mercury vapour over years can produce symptoms of brain and neural disorders. The adverse affects of mercury are demonstrated by the extreme symptoms of brain disorder and body malfunction in people eating fish caught in waters polluted by mercury. The worst instances appear to have been in Japan but there have also been reports of cases in Northern Ontario and Quebec. Recent reports also show that dentists over age 50 have neurological symptoms, and female dentists and dental assistants may have obstetric problems due to their exposure to mercury and its vapours. The perinatal and neonatal effects of the mother's exposure to mercury vapour are a major concern.

At present two of the most important means of cleaning up mercury spills include powdered sulphur and iodine impregnated on charcoal. However both of these materials have the disadvantages that they require considerable time (days rather than hours) to react with the mercury. It is also necessary to maintain contact of the powder and the mercury indefinitely and, of course, there is the general messiness of both sulphur and charcoal, which are either fine powders or can easily form fine powders. Since charcoal is also black a mercury spill on colored carpets in dental offices for example, cannot easily be cleaned up by spreading charcoal and maintaining a charcoal layer in contact with the spilled mercury.

In the prior art copper iodide has been described as a mercury contamination indicator in U.S. Pat. No. 4,226,600 to Seidenberger. Zhang in the journal Huanjing Kexue of the People's Republic of China, Volume 1, issue 1, pages 29–34 (1980), describes a method for recovering mercury dissolved in dilute salt solutions using silver thiosulphate-treated activated carbon. But the use of silver in a mercury removal device is prohibitively expensive.

Irkhin et al. in Russian Pat. No. 688,440 describe the use of alkaline sodium thiosulphate for the removal of dissolved mercury from the effluent of plants manufacturing organic chemicals. Romanian Pat. No. 63,241 to Zeana et al. describes the use of sodium thiosulphate in calcium chloride-containing Solvay process wastes.

U.S. Pat. No. 4,094,777 to Sugier describes a process for removing mercury from a gas or liquid by absorption on a solid mass that contains copper sulphides. Kurikami, in U.S. Pat. No. 3,875,287, describes a method of removing mercury from highly concentrated sulphuric acid by adding iodides to precipitate the mercury as mercuric iodide.

Canadian Pat. No. 1,203,525 describes a composition to absorb mercury vapour and to suppress mercury vapour. The composition comprises a polyhydric alcohol as a carrier liquid, copper ions and thiosulphate ions. However thiosulphate containing compositions have three major drawbacks:

1. Slow release of sulphur dioxide during prolonged storage.
2. Wasted reagents as the composition is a suspension, not a solution.
3. Colour change to black in some cases during prolonged storage.

SUMMARY OF THE INVENTION

The present invention provides compositions that do not suffer from the disadvantages of thiosulphate-containing formulations.

Accordingly the present invention provides a composition to absorb mercury vapour and to suppress mercury vapour, the composition comprising (a) an iodide; and (b) a polyhydric alcohol.

The iodide may be selected from ammonium iodide, an alkaline metal iodide, ethylenediamine dihydroiodide and cuprous iodide.

The polyhydric alcohol may, for example, be selected from propylene glycol, glycerol and dipropylene glycol. Generally speaking the polyhydric alcohol would be selected for its low toxicity and ability to dissolve iodine.

In a preferred embodiment the composition includes a Lewis acid. Preferred Lewis acids are those selected from ammonium chloride, ferric chloride, aluminum chloride, stannous chloride, zinc bromide and ferric sulphate.

The iodide may be formed in situ by reacting hydrogen iodide with a basic compound containing the desired cation eg. cuprous carbonate to form cuprous iodide.

In a further aspect the present invention provides a method of absorbing mercury comprising applying to the source of the mercury a composition comprising (a) an iodide; and (b) a polyhydric alcohol.

DESCRIPTION OF THE PREFERRED EMBODIMENTS

The invention is further illustrated in the following Examples which show the performance of various combinations of ingredients to effect the cleanup and vapour suppression of mercury.

EXAMPLE 1. 2 mL of each test liquid was used to coat the bottom inside surface of a 50 mL Erlenmeyer flask.

2. Approximately 0.2 g (1 drop) liquid mercury was dropped into the test liquid. The test liquid meniscus was just sufficient to coat the mercury droplet.

3. The mercury vapour level 1–2 cm above the test liquid surface was measured using a Perkin Elmer Coleman Mercury Analyzer System (i.e. cold vapour atomic absorption).

4. Mercury vapour levels above the test liquid were measured at various time intervals and were expressed in micrograms mercury per cubic meter of air within the flask.

The results achieved are set out in Table 1.

TABLE 1
Efficiency of Mercury Absorbing Mixtures

| Mercury Absorber # | Mercury Absorber % Composition by Weight | | | | | | Solution or Suspension | Mercury Vapour Levels in μg/m³ Above Mercury Absorber at Various Times | | | | |
|---|---|---|---|---|---|---|---|---|---|---|---|---|
| | Water | Sodium Thiosulphate | Polyol | Iodide Salt** | Lewis Acid | Other Components | | 0 min | 15 min | 30 min | 1 hr | 1 day |
| 1 | 51.26 | 1.84 | PG-40 | KI-1.91 | 0 | CuSO₄.5H₂O—2.57,CaCl₂—2.42 | Suspension | 33 | 23 | 128 | NM | 8 |
| 2 | 0 | 0 | PG-99.9 | CI-0.10 | 0 | 0 | Suspension | 58 | 297 | 88 | NM | 371 |
| 3 | 0 | 0 | PG-95.0 | 0 | NH₄Cl-5.00 | 0 | Solution | 30 | 41 | 67 | NM | 2,300. |
| 4 | 0 | 0 | PG-98.5 | ED-1.50 | 0 | 0 | Solution | 26 | 0 | 1 | 1 | NM |
| 5 | 0 | 0 | PG-99.58 | ED-0.16 | 0 | CuSO₄.5H₂O—.26 | Suspension | 8 | 0 | 0 | 0 | 0 |
| 6 | 0 | 0 | PG-93.18 | ED-1.82 | NH₄Cl-5.00 | 0 | Solution | 27 | 14 | 19 | 15 | 0 |
| 7 | 0 | 0 | PG-95.00 | AI-5.00 | 0 | 0 | Solution | 26 | 25 | 14 | 13 | 11 |
| 8 | 0 | 0 | PG-93.39 | ED-1.50 | NH₄Cl-5.00 | CuSO₄.5H₂O—0.01 | Solution | 24 | 0 | 0 | NM | 0 |
| 9 | 0 | 0 | PG-93.18 | ED-1.82 | FeCl₃-5.00 | 0 | Solution | 9 | 0 | 0 | 0 | 0 |
| 10 | 0 | 0 | PG-93.18 | ED-1.82 | SnCl₂-5.00 | 0 | Solution | 19 | 4 | 0 | 0 | 0 |
| 11 | 0 | 0 | PG-93.18 | ED-1.82 | AlCl₃-5.00 | 0 | Solution | 26 | 0 | 0 | 0 | 0 |
| 12 | 0 | 0 | PG-93.08 | ED-1.82 / CI-0.1 | ZnBr₂-5.00 | 0 | Suspension | 16 | 0 | 0 | 0 | 0 |
| 13 | 0 | 0 | PG-96.0 | ED-2.00 | FeCl₃-2.00 | 0 | Solution | 3 | 0 | 0 | 0 | 0 |
| 14 | 0 | 0 | DPG-97.7 | AI-2.00 | FeCl₃-0.10 | 0 | Solution | 24 | 0 | 0 | 0 | 0 |
| 15 | 0 | 0 | DPG-97.9 | KI-2.00 | AlCl₃-0.10 | 0 | Solution | 23 | 0 | 0 | 0 | 0 |
| 16 | 0 | 0 | DPG-97.9 | AI-2.00 | AlCl₃-0.10 | 0 | Solution | 25 | 0 | 0 | 0 | 0 |
| 17 | 98.5 | 0 | 0 | KI-1.50 | 0 | 0 | Solution | 71 | 2000 | 0 | 0 | 71 |
| 18 | 49.25 | 0 | PG-49.25 | KI-1.50 | 0 | 0 | Solution | 22 | 0 | 0 | 0 | 7 |
| 19 | 98.5 | 0 | 0 | ED-1.50 | 0 | 0 | Solution | 19 | 900 | 26 | 71 | 1500 |
| 20 | 49.25 | 0 | PG-49.25 | ED-1.50 | 0 | 0 | Suspension | 25 | 0 | 0 | 18 | 0 |
| 21 | 0 | 0 | DPG-97.9 | ED-2.00 | Fe₂(SO₄)₃-0.01 | 0 | Suspension | 27 | 4 | 3 | 1 | 0 |
| 22 | 0 | 0 | G-97.9 | AI-2.00 | AlCl₃-0.10 | 0 | Solution | 132 | 17 | 4 | 3 | 0 |
| 23 | 5.00 | 0 | DPG-92.9 | AI-2.00 | AlCl₃-0.10 | 0 | Solution | 23 | 0 | 0 | 0 | 0 |

°PG - propylene glycol, G - glycol, DPG - dipropylene glycol
°°KI - potassium iodide, CI - copper iodide, AI - ammonium iodide, ED - ethylenediamine dihydriodide (AJAY Chemicals Inc, Powder Springs, Florida)
°°°NM - not measured Results show that mercury absorbing solutions containing an iodide salt, Lewis acid and a polyol are superior to solutions lacking any of these components even though some two component formulations, for example ammonium iodide and polyethylene glycol and ethylenediamine dihydroiodide with polypropylene glycol, will produce satisfactory results. These two last formulations are, it should be emphasized, superior to prior art formulations containing thiosulphate ion viewed from the point of view of speed of action with mercury, ease of formulation and lack of sulphur dioxide formation.

It is believed that the compositions according to the present invention become active on exposure to air and light by forming free iodine, which reacts rapidly with mercury. Polyols have low vapour pressures, coat mercury well and are excellent solvents for the active reagents, including the iodine produced in situ.

The Lewis acid is believed to stimulate the dissociation of the iodide to free iodine.

As indicated above, large numbers of polyols are appropriate but, in general, the compounds that will be chosen are those having least toxicity. The information concerning the solubility of the iodides in the polyhydric alcohol and of iodine in polyhydric alcohols can be found in Solubilities of Inorganic and Metal Organic Compound by Seidell, revised by Linke, 4th edition, volume 1, 1958 published by the American Chemical Society, pages 1267 and 1268.

I claim:
1. A composition to absorb mercury vapor and to suppress the formation of mercury vapor, the composition being free of thiosulfate and consisting essentially of:
   (a) an iodide of a cation; and
   (b) a polyhydric alcohol, the iodide and the polyhydric alcohol being present in amounts sufficient to suppress the formation of and absorb mercury vapor.
2. A composition as claimed in claim 1 in which the iodide is selected from the group consisting of ammonium iodide, an alkali metal iodide, ethylenediamine dihydroiodide and cuprous iodide.
3. A composition as claimed in claim 1 in which the polyhydric alcohol is selected from the group consisting of propylene glycol, glycerol and dipropylene glycol.
4. A composition as claimed in claim 1 further containing a Lewis acid.
5. A composition as claimed in claim 4 in which the Lewis acid is selected from the group consisting of ammonium chloride, ferric chloride, aluminum chloride, stannous chloride, zinc bromide and ferric sulphate.
6. A composition as claimed in claim 1 in which the iodide is formed in situ by reacting hydrogen iodide with a basic compound containing the cation.

* * * * *

UNITED STATES PATENT AND TRADEMARK OFFICE
CERTIFICATE OF CORRECTION

PATENT NO. : 4,876,025
DATED : October 24, 1989
INVENTOR(S) : Richard H. Roydhouse It is certified that error appears in the above-identified patent and that said Letters Patent is hereby corrected as shown below:

In the Specification:

Columns 3,4 -- Table in the title after "Polyol" insert an asterisk;

in line 1 change "$CuSO_4 5H_2$--" to -- $CuSO_4 \cdot 5H_2$-- --;

in line 21 change "0.01" to -- 0.10 --;

in the footnote change "*PG-propylene glycerol, G-glycol" to -- *PG-propylene glycol, G-glycerol --; and change "dihydriodide" to -- dihydroiodide --.

Signed and Sealed this

Thirtieth Day of July, 1991

Attest:

HARRY F. MANBECK, JR.

Attesting Officer

Commissioner of Patents and Trademarks